United States Patent Office 2,744,934
Patented May 8, 1956

2,744,934
PROCESS FOR THE PRODUCTION OF CHOLINE HALIDES

Howard C. Klein, Brooklyn, N. Y., and Roland Kapp, Newark, N. J., assignors to Nopco Chemical Company, Harrison, N. J., a corporation of New Jersey No Drawing. Application October 19, 1951,
Serial No. 252,192

8 Claims. (Cl. 260—567.6)

This invention relates to the production of choline halides and more particularly to a new and improved process for producing them.

Choline (beta-hydroxyethyl trimethylammonium hydroxide) is a member of the vitamin B group and is generally considered to be essential for normal nutrition. Synthetic choline, generally employed in the form of choline chloride, is particularly useful and has a ready market in the vitamin fortification of animal and poultry feeds.

Many methods for producing choline halides are known from the prior art. These disclosures are principally concerned with the production of choline chloride. In Compt. rend. 65, 1015 (1867), Wurtz discloses a process for the preparation of choline which consists in heating trimethylamine and an excess of ethylene chlorohydrin in a sealed tube. Likewise, in J. A. C. S. 32, 128 (1910) Renshaw describes a method by which practically quantitative yields of choline chloride can be produced by heating previously cooled, freshly distilled, anhydrous ethylene chlorohydrin with gaseous trimethylamine in a bomb tube. A still further method that has been employed for the production of choline chloride is disclosed in U. S. Patent No. 2,457,226 whereby a mixture containing choline chloride is produced by reacting beta-(alkoxymethoxy) ethyl trimethylammonium formate with hydrochloric acid and an alkanol.

Although these prior art processes give satisfactory quantitative yields of choline chloride these processes are disadvantageous in that they are not readily adaptable to plant scale production. For the prior art processes generally, and the cited examples of the art specifically, require the use of pressure equipment and/or rather elaborate procedures or reaction conditions in order to bring about satisfactory results.

It is the object of this invention to provide an improved method for producing choline halides.

A further object of this invention is to provide a means for producing choline halides from readily available raw materials.

Another object of this invention is to provide a simple means for producing choline halides which eliminates the necessity for the use of elaborate equipment or exhaustive procedures.

A still further object of this invention is to provide a method for producing choline halides in a relatively short period of time.

Other objects of the invention will in part be obvious and will in part appear hereinafter.

It has been discovered that the above and other objects of the invention can be readily accomplished by reacting a methyl halide with dimethylethanolamine. The reaction is readily accomplished in either the presence or absence of a solvent. In the preferred practice of the invention, the reaction is effected in the presence of catalytic quantities of boron trifluoride etherate complex at temperatures not exceeding about 25° C. and at atmospheric pressure.

As the starting material in the preparation of choline halides by our novel process we employ a methyl halide. The use of such halides in this process is economically advantageous due to the fact that they have many and varying commercial uses and hence are readily available in commercial quantities as raw materials. Under ordinary conditions of temperature and pressure, for example, room temperature and atmospheric pressure, methyl chloride, methyl fluoride and methyl bromide exist in a gaseous state while methyl iodide is a colorless liquid.

The methyl halide employed in this process is reacted with dimethylethanolamine. The reaction proceeds exothermically and thus, ordinarily, requires the application of little or no external heating. In fact, it has been found that the reaction produces the most satisfactory results when the methyl halide-dimethylethanolamine reaction mixture is externally cooled or chilled by some suitable means.

It is preferred when preparing a choline halide according to the process of our invention that a slight excess of methyl halide, over and above the theoretical amount required, be employed. By employing such an excess, the reaction is not only facilitated but also compensation for inadverent losses of the volatile methyl halides is accomplished. However, the use of such excess is optional. Thus, if desired the reaction can be carried out using a ratio of one mole of methyl halide to one mole of dimethylethanolamine or it can be accomplished using an excess of dimethylethanolamine. However, in the preferred embodiment of the invention, the novel process is carried out by reacting about 1.5 moles to 2.0 moles of a methyl halide with about 1.0 mole of dimethylethanolamine.

Ordinarily, it is preferred that the reaction between the methyl halides and the dimethylethanolamine be accomplished while the reactants are dissolved in a solvent. In general, any inert solvent in which the reactants are soluble can be used. Those solvents which have been found to be extremely well suited for use in this process include ketone solvents having a carbon chain length of from about 3 to 6 carbon atoms such as, acetone, methyl ethyl ketone, methyl isobutyl ketone, etc.; ester solvents having a carbon chain length of from about 3 to 8 carbon atoms such as, butyl acetate, isoamyl acetate, ethyl propionate, etc.; alcohols having a carbon chain length of from about 1 to 8 carbon atoms such as, ethyl alcohol, propyl alcohol, butyl alcohol, etc.; and hydrocarbon solvents, both aliphatic and aromatic, containing from about 6 to 8 carbon atoms such as, hexane, heptane, octane, benzene, etc. In carrying out the reaction in the presence of a solvent, the volatile methyl halides, that is, the methyl chloride, methyl bromide or methyl fluoride, are bubbled directly into the particular solvent in use whereas the liquid methyl iodide is merely added in liquid form to the solvent. The amount of solvent to be employed is not critical. However, one should use a quantity of solvent sufficient to dissolve completely the methyl halide at the temperature at which the reaction is conducted. The quantity of solvent employed should also be sufficient to maintain the reaction mixture in a condition whereby it can be easily handled and the product of the reaction easily isolated therefrom. Thus, if the ratio of solid material to solvent is great the mixture will become very thick and thus be less easily manipulated. Therefore, when carrying out the reaction of this invention in the presence of a solvent it has been found that the most satisfactory results are obtained when there are at least three parts of solvent employed for each part of reactant present.

The use of a solvent, however, as was stated previously, is purely a matter of discretion inasmuch as the reaction is readily carried out in the absence of a solvent and the results achieved thereby are highly satisfactory. When the reaction is carried out without employing a solvent, the gaseous methyl halides are bubbled directly into the dimethylethanolamine and dissolved therein and the liquid methyl iodide is dissolved directly in the dimethylethanolamine. It has been found that it is extremely beneficial, although not absolutely necessary, when proceeding in this manner to employ an excess of dimethylethanolamine. In such cases, it is preferred to react from about 1.5 moles to about 2.0 moles of dimethylethanolamine with each mole of methyl halide.

The excellent results obtained by following the teachings of this invention and the relative ease with which these results are achieved are, in part, attributable to the use of catalytic quantities of boron trifluoride etherate. This catalyst is added either to the solvent solution in which the methyl halide is dissolved or, in the absence of the solvent, the boron trifluoride etherate complex is added directly to the reactants. While the boron trifluoride etherate is effectively employed in quantities ranging from about 0.5% to about 4.0% calculated by weight on the methyl chloride, it has been found that the use of from about 1.0% to about 1.5% is the most practical from the standpoint of economy and efficiency. However, the presence of boron trifluoride etherate catalyst is not essential to the practice of this invention. While the use of the catalyst in the reaction often increases the yield of the choline halide, the other advantages of the invention can be realized even where the reaction is carried out in the absence of the catalyst.

This process is very readily accomplished at relatively low temperatures and at atmospheric pressure. It is apparent that the use of such conditions is an economically desirable feature of the invention. Moreover, these conditions render the process more easily adaptable to conversion to large scale plant production. In carrying out the reaction according to the preferred embodiment of the invention, we prefer to precool the solvent in which the methyl halide is to be dissolved to a temperature of about 10° C. prior to the actual dissolution of the methyl halide therein. The catalyst, if one is to be employed, is then added to the solvent solution of the methyl halide and the ensuing solution is further chilled to a temperature of from about −20° C. to 5° C. The dimethylethanolamine is thereafter admixed in the solution. The reaction which ensues is exothermic and thus is accompanied by a subsequent rise in the temperature of the solution. If the reaction temperature tends to rise above about 25° C. external cooling should be applied at this point in the process.

When the reaction is carried out without the employment of a solvent, the procedure followed is analogous to the procedure used when the reaction is carried out in the presence of a solvent. In such a case the dimethylethanolamine itself, to which the catalyst, if one is to be employed at all, has been previously added, is precooled to a temperature of from about −20° C. to 5° C. prior to the addition of the methyl halide. Here also, the reaction, upon the admixture of the reactants, proceeds exothermically and care must be taken that the temperature of the reaction mixture does not rise above a temperature of about 25° C.

The choline halide obtained can be isolated from the reaction mixture by any method known to the art. However, either of the two following procedures are preferably employed, each of which gives excellent results. The first method by which the choline halide can be isolated from the solvent-free reaction mixture involves the removal of the unreacted, excess dimethylethanolamine by distillation in a vacuum system. The residue remaining after this distillation, of which the desired choline halide constitutes the major portion, is dispersed in a solvent in which only the dimethylethanolamine is soluble, for example, acetone. The solution is stirred well to insure complete dissolution of the amine constituent in the solvent, following which the solution is allowed to stand undisturbed while the insoluble choline halide settles to the bottom of the solution in the form of crystals. The crystalline product is then recovered by filtration and further purified, if desired, by crystallization from a suitable solvent. This procedure is decidedly advantageous not only due to the fact that the choline halide is obtained from the original separation in a relatively pure state but also because the excess dimethylethanolamine which was employed, and which did not take part in the reaction, can be recovered and subsequently reused. An alternate procedure which can be employed with completely satisfactory results involves the addition to the reaction mixture of a solvent, for example, isopropanol, in which only the dimethylethanolamine is soluble at room temperature. The solution, thus formed, is stirred well to facilitate complete dissolution of the amine constituent in the solvent and finally allowed to stand undisturbed while the insoluble choline halide settles to the bottom of the solution in crystalline form. The crystals can be readily recovered by filtration, purified by crystallization, if desired, and dried.

It may sometimes happen, particularly in small batches where the heat produced by the reaction is easily dissipated, that the heat of the reaction will not raise the temperature of the reaction mixture to the maximum temperature desired, that is, a temperature of about 25° C. In such a case the reaction mixture should be heated to a temperature of about 25° C. to facilitate complete reaction of the materials. The reaction mixture is preferably maintained within the temperature range of from about 15° to 25° C. for a period of time of from about one and a half to about two hours, following which the mixture is cooled to a temperature of about 5° C. When the reaction is carried out in the presence of a solvent, the solution is preferably maintained at a temperature of about 5° C. for a period of from about 16 to 24 hours until complete separation of the desired halide from the solution takes place.

Mention has been previously made of the fact that the process of this invention can be readily accomplished at atmospheric pressure. This is an exceedingly desirable feature of the invention inasmuch as the necessity of using elaborate, costly, pressure type equipment is eliminated. However, it should not be concluded from this that the reaction is not operable under pressure. The reaction is entirely operable when carried out under pressure. However, the advantages, if any, gained by the use of such pressures, are economically outweighed by the advantages gained in carrying out the reaction at atmospheric pressure. Therefore, in the preferred embodiment of the invention we prefer to carry out the reaction at atmospheric pressure.

Similarly, although the preferred embodiment of this invention contemplates the use of a temperature of about 25° C., it should not be concluded that the process is restricted to the use of this temperature. The sole limiting factor in the determination of the proper temperature conditions is the volatility of methyl halide employed. Obviously, if the temperature used is such that much of the methyl halide will volatilize from the reaction mixture before it has an opportunity to react with the dimethylethanolamine, the yield of choline halide will be reduced. If temperatures much above about 25° C. are employed when one of the gaseous methyl halides is a reactant, it will be necessary to employ a relatively large excess of the methyl halide in order to obtain complete reaction of the dimethylethanolamine, or else it will be necessary to carry out the reaction under pressure in order to prevent loss of the methyl halide. Therefore, while the use of temperatures above about 25° C. is possible, particularly when the higher boiling methyl iodide is employed, such use is not desirable from a practical aspect, and in its preferred form the process is carried out at temperatures not above about 25° C. It is not intended, however, that temperatures in excess of 25° C. should be excluded from the scope of the present invention.

The invention disclosed herein constitutes a novel, efficient, and practical synthesis of choline halides by a single step process. The yields which are obtained using this process are high, and the products obtained have a very high degree of purity, that is, about 98% to 99% pure choline halide. If desired, however, the products originally obtained from the reaction mixture can be further purified by crystallization from suitable solvents such as isopropanol, isobutanol, etc. Our invention, furthermore, enables us to use readily available raw materials in the production of the highly valuable choline halides at temperatures around or lower than room temperature and at atmospheric pressure.

For a fuller understanding of the nature and objects of this invention reference should be had to the following examples which are given merely as further illustration of the invention and are not to be construed in a limiting sense.

Example I

In the present example 9 grams (0.18 mole) of methyl chloride were dissolved in 50 ml. of acetone, the acetone having been previously cooled to a temperature of about 10° C. To this solution 0.1 gram of boron trifluoride etherate complex was added and the ensuing solution chilled to a temperature of about 5° C. When this temperature was attained, 9 grams (0.1 mole) of dimethylethanolamine were added to the solution and the reaction commenced and proceeded exothermically. The temperature of the solution was allowed to rise to about 15° C. at which temperature the reaction mixture was maintained, with intermittent cooling, for about 45 minutes. At the end of this time the temperature of the reaction mixture was elevated to about 25° C. and so maintained for an additional 45 minutes. After the expiration of this period, the reaction mixture was chilled to a temperature of about 5° C. and allowed to stand at that temperature overnight. At the end of this time the choline chloride was found to have separated from the solution in the form of a white crystalline product which was readily recovered by filtration. The crude choline chloride thus produced was obtained in a yield of 100% of theory, calculated by weight on the dimethylethanolamine originally employed. Upon crystallization from isopropanol, a 93.5% yield of choline chloride which analyzed 98 to 99% pure for choline chloride was obtained.

Example II

In this example 50 ml. of dimethylethanolamine were chilled to a temperature of about −20° C. in a Dry Ice-methanol bath. Into this precooled amino alcohol 3.0 g. of gaseous methyl bromide was passed. The reaction which ensued was exothermic and the reaction mixture quickly solidified. An additional 7.0 g. of methyl bromide dissolved in 35 ml. of isopropanol was then added to the solidified mass. The reaction mixture was maintained at a temperature of from about 15° C. to about 25° C. for a period of about an hour. At the end of this time the reaction mixture was cooled to a temperature of about 5° C. and 50 ml. of diethyl ether were added thereto. The separation of choline bromide from the reaction mixture in crystalline form resulted. The product, i. e., crude choline bromide, was obtained in a yield of 18.9 g., 97.2% of theory and analyzed 96.5% pure choline bromide. The crude product was subsequently crystallized from ether and alcohol to give pure choline bromide.

Having described our invention, what we claim as new and desire to secure by Letters Patent is:

1. A process for the production of a choline halide comprising reacting a methyl halide with dimethylethanolamine in the presence of a catalytic quantity of boron trifluoride etherate.

2. The process of claim 1 wherein the amount of boron trifluoride etherate employed is from about 0.5% to about 4.0%.

3. The process of claim 1 wherein the amount of boron trifluoride etherate employed is from about 1.0% to about 1.5%.

4. The process of claim 1 wherein the reaction is effected at a temperature not above about 25° C.

5. The process of claim 4 wherein the reaction is effected while the reactants are dissolved in an inert solvent.

6. A process for the production of a choline halide comprising reacting a methyl halide with dimethylethanolamine in an inert solvent selected from the class consisting of ketones having a carbon chain length of from about 3 to 6 carbon atoms, esters having a carbon chain length of from about 3 to 8 carbon atoms, alcohols having a carbon chain length of from about 1 to 8 carbon atoms and hydrocarbons containing from about 6 to 8 carbon atoms, with the reaction being effected at a temperature not above about 25° C., wherein the reaction is carried out in the presence of about 0.5% to about 4.0% of boron trifluoride etherate.

7. A process for the production of choline chloride comprising reacting methyl chloride with dimethylethanolamine in an inert solvent selected from the class consisting of ketones having a carbon chain length of from about 3 to 6 carbon atoms, esters having a carbon chain length of from about 3 to 8 carbon atoms, alcohols having a carbon chain length of from about 1 to 8 carbon atoms, and hydrocarbons containing from about 6 to 8 carbon atoms, with the reaction being effected at a temperature not above about 25° C., wherein the solvent employed is acetone and wherein from about 1.0% to about 1.5% of boron trifluoride etherate is present as a catalyst.

8. A process for the production of choline chloride comprising reacting methyl chloride with dimethylethanolamine in an inert solvent selected from the class consisting of ketones having a carbon chain length of from about 3 to 6 carbon atoms, esters having a carbon chain length of from about 3 to 8 carbon atoms, alcohols having a carbon chain length of from about 1 to 8 carbon atoms, and hydrocarbons containing from about 6 to 8 carbon atoms, with the reaction being effected at a temperature not above about 25° C., wherein the solvent employed is isoamyl acetate and wherein from about 1.0% to about 1.5% of boron trifluoride etherate is present as a catalyst.

References Cited in the file of this patent

UNITED STATES PATENTS

| Number | Name | Date |
| --- | --- | --- |
| 1,518,689 | Callsen | Dec. 9, 1924 |
| 1,526,627 | Callsen | Feb. 17, 1925 |
| 2,192,925 | Major et al. | Mar. 12, 1940 |
| 2,212,149 | Brubaker et al. | Aug. 20, 1940 |

FOREIGN PATENTS

| Number | Country | Date |
| --- | --- | --- |
| 54,113 | Holland | Mar. 15, 1943 |
| 233,519 | Germany | Apr. 8, 1911 |

OTHER REFERENCES

Beilstein: "Handbuch der Organischen Chemie" (1929) vol. IV suppl. page 426.